Nov. 5, 1957     O. L. CULBERSON ET AL     2,812,249
CARBON IMPREGNATED SOLIDS AND METHOD OF PREPARING THE SAME
Filed Dec. 23, 1954     2 Sheets—Sheet 1
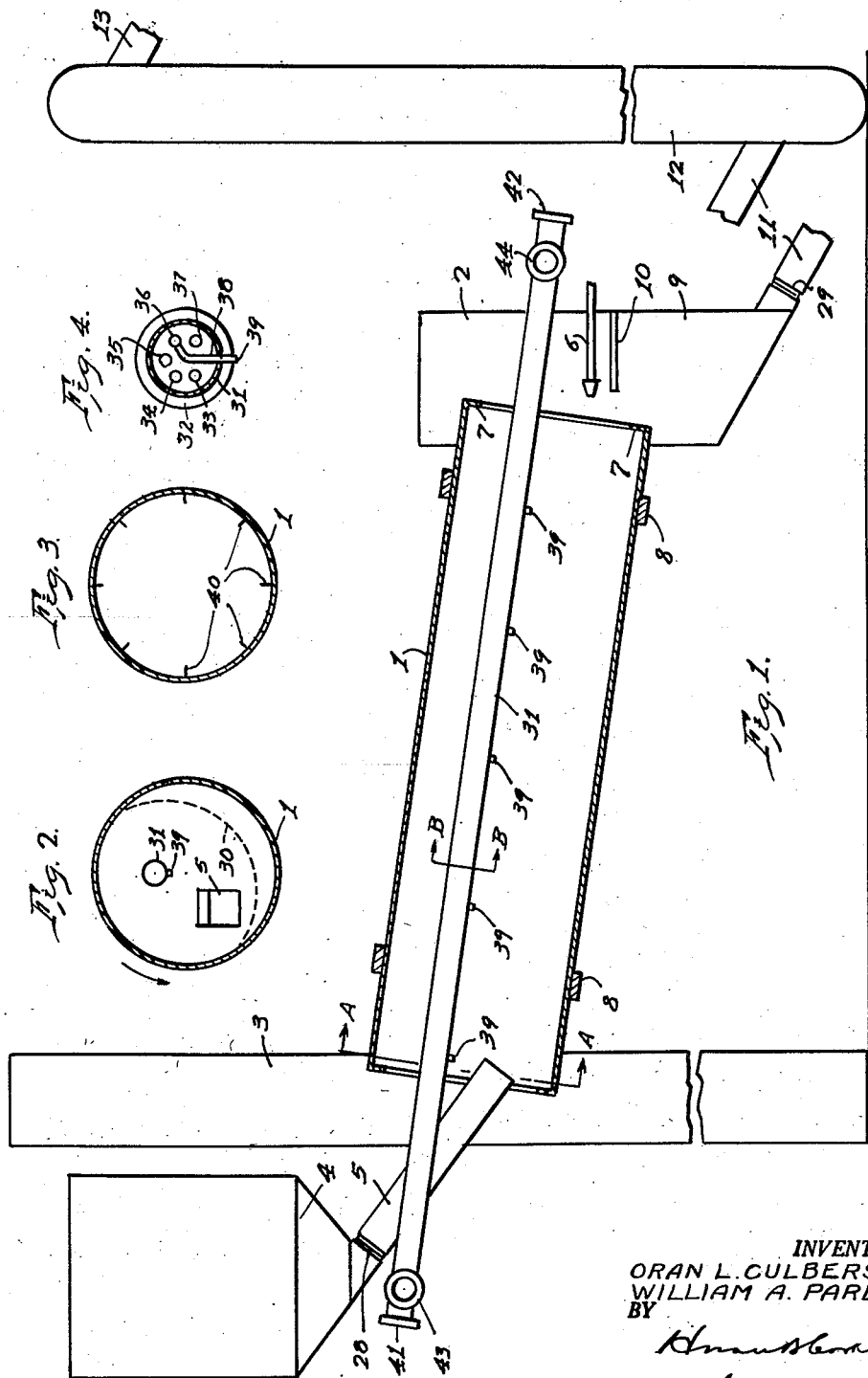
INVENTORS
ORAN L. CULBERSON
WILLIAM A. PARDEE
BY
ATTORNEY:

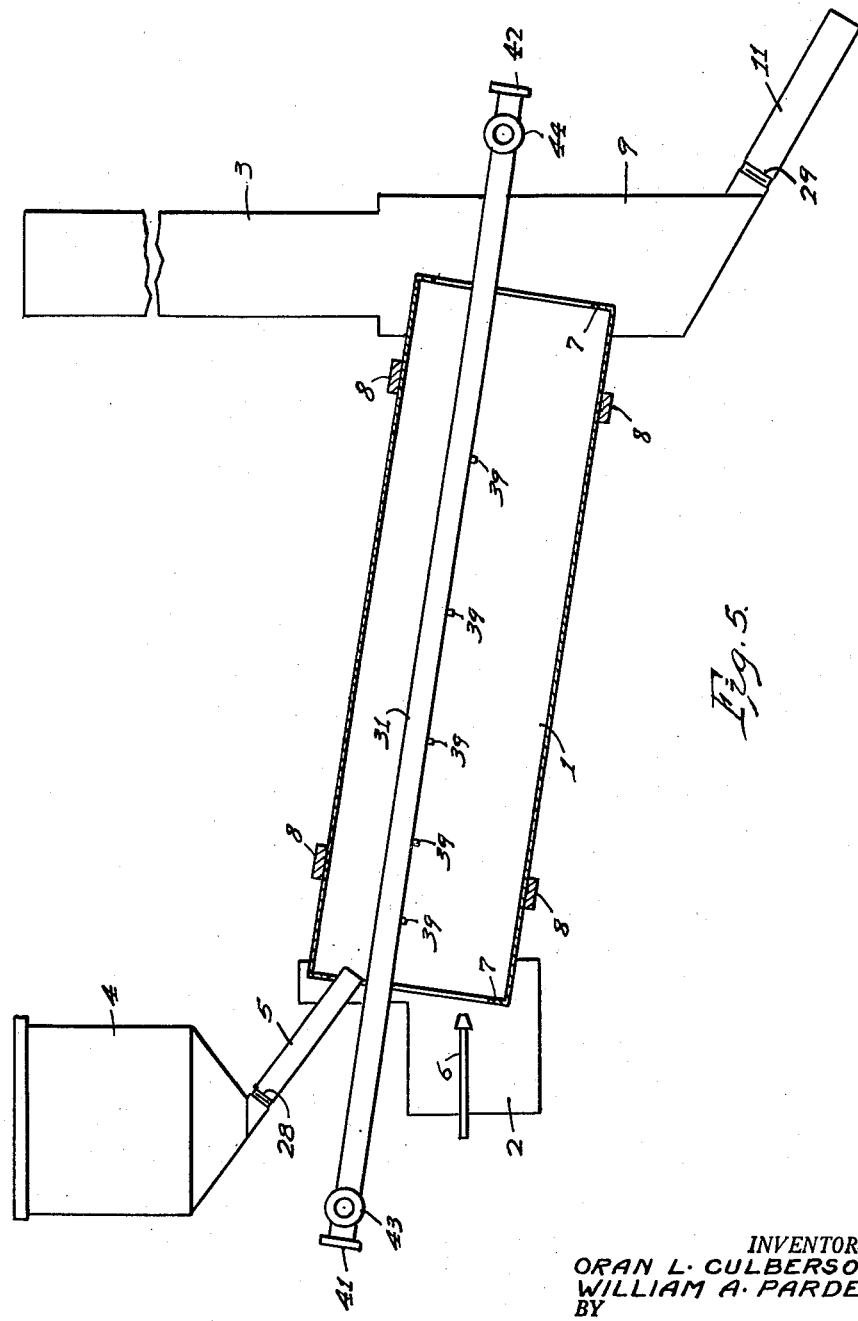

United States Patent Office 2,812,249
Patented Nov. 5, 1957

2,812,249

CARBON IMPREGNATED SOLIDS AND METHOD OF PREPARING THE SAME

Oran L. Culberson, Corpus Christi, Tex., and William A. Pardee, Fox Chapel, Pa., assignors to Gulf Research & Development Company, Pittsburgh, Pa., a corporation of Delaware Application December 23, 1954, Serial No. 477,346

9 Claims. (Cl. 75—4)

This invention relates to carbon impregnated solids and method of preparing the same and more particularly to a highly reactive aggregate of an oxide ore and carbon and to a process wherein such an ore, with or without the addition of coke, is introduced into a horizontal rotary kiln, is heated therein, is saturated with asphalt during its passage through the said kiln, the said asphalt being applied to the ore at a multiplicity of spaced points, and the asphalt is coked in the pores of and upon the ore during the heating, thus forming an intimately combined and highly reactive aggregate of ore and carbonized asphalt.

Many materials, particularly in the chemical industry, are required in a form in which they are in intimate admixture and contact with carbon. This is particularly true in the case of oxides which are to be reduced. Oxide ores such as those of aluminum, phosphorus, titanium, zirconium, etc., are good examples.

In the processes commonly used for the large scale reduction of oxides, the oxide and carbon are usually mixed together and subjected to heat. The individual particles of oxide and of carbon as commonly processed are often of a size several inches in diameter, and in some cases they are broken down to a size of the order of one hundredth of an inch. These particles are sometimes in loose admixture and sometimes are briquetted together. We have found the materials to be much more reactive, and reactive at a lower temperature, if the oxide and the carbon are in more intimate mixture and contact such as is produced by saturating a porous or absorbent oxide with asphalt and then carbonizing the asphalt in the pores of the oxide at high temperature. This impregnation of an oxide ore with carbon is effected by introducing the oxide, advantageously in particles of half inch size or smaller, into a heated horizontal rotary kiln in which it is heated and at least partially saturated with asphalt which will flow at the kiln temperature, by continuing the heating of the oxide and asphalt mixture (herein sometimes referred to as material-in-process) to a point at which the asphalt is at least partially coked, by adding further asphalt to the material-in-process at a number of successive points during its progress through the rotary kiln and so spacing the points of asphalt introduction as to permit substantial coking of each charge of asphalt prior to the introduction of the next such charge, the degree of coking between successive charges of asphalt being to a stage at which the material-in-process will not adhere to the walls of the kiln to such a degree as to prevent its further longitudinal travel therein.

The aggregate prepared in the manner just described can be discharged from the rotary kiln at any reasonable temperature desired, this being controlled by the firing of the kiln. In the case of bauxite it will be in the neighborhood of 1500° to 1600° F. In the case of phosphate rock it can be 2000° F. or somewhat higher. It is then charged into other apparatus to be heated, chlorinated, or otherwise reduced.

We proportion the charge of asphalt to that of oxide so as to deposit carbon in the pores of the oxide in the proportion requisite to reduce the specific oxide, and we find that an aggregate containing such a percentage of carbon is best prepared by adding and carbonizing the asphalt in a series of increments, each increment proportioned to add approximately three percent to eight percent of carbon to the oxide. These increments are advantageously proportioned with the lower percentages at the cooler end of the horizontal rotary kiln and the higher percentages at the hotter end of the kiln. Also the spacing of the points at which successive increments are introduced is advantageously somewhat greater at the cooler end of the kiln than at the hotter end of the kiln because the partially cooled gases require more time, and therefore more kiln length, to accomplish the carbonization than do the hotter gases at the furnace end of the kiln.

The asphalt used in this process may vary over a wide range in characteristics but an asphalt of relatively high fixed carbon content is preferred for oxides of low porosity and an asphalt of relatively low melting point and low fixed carbon for oxides of high porosity. We have successfully used vacuum tower residuums of Baxterville (Mississippi) crude, vacuum tower bottoms from the running of mixed West Texas crude, Eastern Venezuela vis-broken petroleum pitch and lighter asphalts. The Baxterville residuums ranged from a 33% residuum with 37.5% carbon residue and 267° F. softening point (ASTM Method D36) to an 18% residuum with 55% carbon residue and 440° F. softening point. The West Texas vacuum tower bottoms had a 17% carbon residue and a softening point of 88° F. The Eastern Venezuela vis-broken petroleum pitch had a softening point of 350°–360° F., 55% volatile matter, and 45% fixed carbon. When using asphalts with softening points of 200° F. and above it is practical to introduce the first portion of asphalt into the kiln with the oxide ore as discrete solid material.

We have invented an aggregate which is a highly reactive combination of oxide ore and carbon and a novel method of producing the same. Also a particularly effective and efficient device for continuously preparing these aggregates. The device used in the preparation of our aggregate is shown in the accompanying drawings, and the method will subsequently be described in connection therewith.

Referring to the accompanying drawings Figure 1 is a cross section view of the rotary kiln and its related parts.

Figure 2 is a cross section view taken on A—A of Figure 1.

Figure 3 is a cross section view of the rotary kiln, showing a convenient style of longitudinal bars or "lifters" therein.

Figure 4 is a cross section view of element 31 and related parts, taken on B—B of Figure 1.

Referring to Figure 1, numeral 1 indicates a horizontal rotary kiln, extending from furnace chamber 2 at its lower end to stack 3 at its upper end. A raw material bin for material to be processed is indicated by numeral 4 and a chute 5 extends from the base of bin 4 into the upper (charging) end of kiln 1. Flow of material from bin 4 to kiln 1 is controlled by gate 28. The kiln is heated by burner 6, this burner being set back in furnace chamber 2 so that its flame will not ignite asphalt introduced, as hereinafter described, at the nearest nozzle 39. The kiln 1 discharges processed material at its lower end into receiving bin 9, which is separated from furnace chamber 2 by wall 10. A chute 11 extends from the base of receiving bin 9 to the base of elevator 12, and a gate 29 is provided to control the flow of material from bin 9 to elevator 12.

A jacketed conduit 31 extends through the entire length of horizontal rotary kiln 1, with its respective ends extending through and out beyond stack 3 and furnace chamber 2. It may be supported by the walls of these members 3 and 2 or by separate supports. Conduit 31 is fitted with a series of spray nozzles 39 and it carries in its interior a number of separate smaller conduits, 34 to 37 inclusive (subsequently described in connection with Figure 4), which extend from the individual spray nozzles to headers 41 and 42. Conduit 31 is also fitted with flanges 43 and 44 adjacent its respective ends to permit the introduction and circulation of steam or some other temperature controlling fluid in conduit 31 around the exterior of the aforementioned smaller conduits.

Referring to Figure 2, this is a cross section of the rotary kiln taken on section line A—A of Figure 1. Figure 2 shows the discharge end of chute 5 and it shows jacketed conduit 31. Conduit 31 is positioned with its longitudinal axis parallel to the longitudinal axis of horizontal rotary kiln 1, and its axis will be at a point high enough to spray liquid asphalt onto the contents of the kiln from nozzle 39. The longitudinal axis of jacketed line 31 may be positioned somewhat to the side of the vertical axis of the kiln 1 in order to avoid having the material-in-process fall upon it during rotation of the kiln. Numeral 30 identifies a dotted line depicting the approximate surface of the discrete material-in-process while the kiln is rotating in a contra-clockwise direction.

Figure 3 is a cross sectional view of kiln 1 showing the interior thereof fitted with a series of longitudinal ledges or "lifters" 40 to increase the agitation of discrete material-in-process during its progress through the kiln. These have some advantages in the hotter end of the kiln.

Figure 4 is a cross section of jacketed conduit 31, taken on section line B—B of Figure 1. In this view, numeral 31 indicates the metallic conduit and 32 indicates a heavy jacket of insulating material which entirely surrounds conduit 31. Numerals 33, 34, 35, 36 and 37 indicate a series of smaller separate conduits inside of conduit 31 which lead to individual spray nozzles 39 and which terminate at their other end at header 41 or 42, at which point they are connected to individual supply lines, not shown. The number of these smaller conduits is determined by the needs of the process as hereinafter discussed. Each of the conduits of the series 33 to 37 inclusive is connected to a spray nozzle 39 through a connection 38. Figure 4 shows the manner of the connection from smaller conduit 36 to its nozzle 39.

Figure 5 is a modification of the kiln shown in Figure 1. All the numbered parts of Figure 5 correspond to those of Figure 1, and the difference between the apparatus of Figure 1 and that of Figure 5 is that the furnace 2 and the stack 3 in Figure 5 are at ends of the kiln 1 opposite to those shown in Figure 1. In the apparatus of Figure 1 the material-in-process and the combustion gases flow counter-current, while in the apparatus of Figure 5 the material-in-process and the combustion gases flow in the same direction.

In the practice of this invention bin 4 is loaded with oxide, for example bauxite ore, of approximately half inch and less in size. There is advantage in having the oxide fairly fine. Kiln 1, rotated by means of gears 8, is put in operation. Burner 6 is ignited to provide the necessary heat for the operation. Ore from bin 4 is passed through chute 5 into horizontal rotary kiln 1. A gate 28 or star-valve or other device of similar function is positioned to control the flow of ore from bin 4 into kiln 1.

When the operation is well established and conditions have attained equilibrium the material being processed will discharge over flange 7 of kiln 1 into bin 9 at the temperature desired, this discharge temperature being controlled by the firing. In the case of bauxite the temperature is not ordinarily permitted to exceed approximately 1600° F. In the case of phosphate rock it may go to 2100° F. The material entering kiln 1 from bin 4 may be at atmospheric temperature or it may be at a somewhat elevated temperature.

Asphalt to be sprayed on the ore during its passage through the kiln is charged through conduits 33, 34, 35, 36 and 37, all encased in conduit 31. This conduit 31 is exposed to the high temperature gases in kiln 1 and to prevent overheating and possible coking of the asphalt in conduits 33 to 37 inclusive two separate means of protection are provided. The first is heavy fireproof insulation 32 of minimum heat conductivity. The second is a continuous flow of steam or other temperature controlling fluid through the conduit 31. Flanges 43 and 44 are provided to receive and discharge the temperature controlling fluid. This temperature controlling fluid may be introduced at either end or it may with some advantage be conducted in a closed pipe inside conduit 31 to a point part way through the length of conduit 31 and discharged therefrom to both ends 43 and 44.

When our apparatus is to be used for a purpose which will produce a large quantity of hydrocarbon vapors in the kiln we may also enclose one or more air lines (not shown) in conduit 31 and introduce secondary air at various points along the length of the kiln for the combustion of these vapors.

It is desirable to be able to positively control the amount of asphalt introduced at each point of introduction, wherefore a separate pipe of the group 33 to 37 inclusive is provided for each spray nozzle 39. The separate pipes connect to either header 41 or header 42 and are there connected to lines from asphalt pumps. A separate line from a separate pump to each individual nozzle 39 permits volumetric control of the asphalt introduced at each nozzle 39 and also serves to reduce possibility of coking a portion of a line or coking a nozzle 39 as would occur much more readily if several nozzles were served by a single line and the asphalt were free to flow out through the channel of least resistance. To minimize the heating of asphalt in conduits 33 to 37 inclusive by the hot gases in the kiln it is advantageous to extend some of these lines inward from header 41 and some from header 42 according to the relative proximity to those headers of the individual terminal nozzle 39 and the severity of the heat in the section of the kiln that the conduit must pass through.

While the accompanying drawings show five asphalt charging conduits, 33 to 37 inclusive, it is not necessary that there be that specific number. The actual number in any particular installation may be greater or in some special cases somewhat less, according to the kiln temperature and carbonizing characteristics of the asphalt. The actual number of points of introduction of asphalt along the length of the kiln should be sufficient to permit the individual increments of asphalt to be so limited in quantity that each individual increment will be promptly absorbed into the material-in-process and rapidly coked, thereby preventing the formation of a large sticky mass that would adhere to the walls of the kiln.

The minimum amount of carbon required in an aggregate is that amount which will react with all of the combined oxygen of the ore to reduce the same. We have found that the required minimum of carbon to reduce the ore is an amount within the range of from 45 pounds of carbon up to 60 pounds of carbon per hundred pounds of oxygen in the dry ore. In the preparation of the aggregate it may be necessary to use more asphalt than that necessary to produce the above amount of carbon, this additional amount going to provide for three other sources of carbon consumption, viz.: burn-off of carbon in the kiln if excess air is present; burn-off of carbon in handling hot briquettes from kiln to subsequent processing apparatus; and burn-off in the final processing (e. g. chlorination) if air or oxygen is introduced at that stage to maintain the temperature of reaction or for other purposes. The magnitude of these three demands for carbon is determined exclusively by conditions of operation, which are within the control of the operator, and this additional carbon should be provided according to need. In the case of a phosphate rock aggregate the theoretical carbon requirement for conversion of oxygen to $CO_2$ will run 0.8 pound per pound of $P_2O_5$ in the rock, with additional carbon for reduction of accompanying oxides, heat loss, burn-off, etc. In a kiln which operates with the furnace gases flowing countercurrent to the material-in-process and with the gases leaving the kiln and entering the stack 3 at from 600° to 800° F., the maximum percentage of asphalt that can ordinarily be introduced at the stack end of the kiln is such as will add about three percent to five percent of carbon to the ore, measured after the asphalt is coked by the heat in the kiln. With a temperature of 1700° to 2000° F. for the furnace gases entering the kiln at the hot end, the maximum percentage of asphalt that can ordinarily be introduced from one nozzle close to that end is such as will add anywhere from about five percent to seven and one-half percent of carbon to the material-in-process. Quantities of asphalt intermediate the foregoing figures are introduced at the intermediate nozzles. The introduction of asphalt at the various nozzles in lesser quantities than those just stated is unobjectionable except that such practice may require a greater number of nozzles and even additional length of kiln. The introduction of asphalt at one point in greater quantity than can be promptly coked will produce a sticky mass that will not move longitudinally through the kiln and will seriously interfere with the operation.

The minimum amount of asphalt that must be introduced to produce a certain amount of carbon on the oxide being processed is susceptible of ready calculation from the fixed carbon content of the particular asphalt used, but that figure must be increased to allow for the carbon burned as a consequence of any excess air in the combustion gases. The amount of excess air is solely within the control of the operator, and this excess air should be kept to a minimum or be totally eliminated, even at the expense of some loss of efficiency in combustion of fuel.

In Figure 2 we have shown the conduit 31 with the nozzle 39 pointing directly downward. In some cases it may be more advantageous to rotate the conduit 31 counter-clockwise about 45°, the actual position being chosen to put the spray of asphalt on the material-in-process and to keep it away from the shell of kiln 1.

The combustion gases from the burner 6, together with distilled-off volatile matter, pass out of the upper end of the kiln into stack 3 and discharge to the atmosphere.

The material prepared in kiln 1 is finally discharged over the flange 7 at the lower end of the kiln into receiving bin 9, this bin being separated from furnace chamber 2 by means of wall 10. At this stage this material is aptly termed aggregate. From bin 9 the aggregate is conducted to other apparatus for further processing. Passage of aggregate from bin 9 to chute 11 is controlled by gate 29.

It is not ordinarily desirable to charge to the final reducing equipment or chlorinating retort any large proportion of pieces of aggregate with a maximum dimension in excess of five inches. If the aggregate discharges from kiln 1 in larger size pieces than are desired for charging to subsequent processing apparatus, a crusher can be installed in the system at a point immediately after bin 9.

In the final utilization of the aggregate of our invention it is sometimes advantageous to introduce some air or oxygen to effect limited combustion and thereby generate heat to maintain the necessary temperature for reaction. Such practice of course consumes a part of the carbon in the aggregate and when this use of oxygen or air is anticipated an increased percentage of carbon should be incorporated in the aggregate being produced in kiln 1 in order that sufficient carbon may be present to permit ready reduction of the ore.

The foregoing description of our process covers an operation in which only bauxite and asphalt are charged to kiln 1. However, our process is not so limited and we may charge some finely divided coke to the kiln with the ore, thus reducing the amount of asphalt required. As in the case of other aggregates made by our process, the aggregate made with bauxite and asphalt alone is uncommonly reactive, having a higher surface area (measured in square meters per gram) than is attainable with other available combinations of oxide and carbon, and it is preferable that added coke, if any, be a minor proportion in relation to that formed from the asphalt in kiln 1.

It has been stated that the aggregate produced in kiln 1 and subsequently subjected to further processing is characterized by a higher degree of porosity and a greater pore surface area than has previously been known to the art, and that this greater porosity appears to be the reason that we are able to attain results in the subsequent processing that have not previously been possible. Specific pore surface areas have been measured. These pore surface areas have been determined by the well known B. E. T. method, developed by Brunauer, Emmett, and Teller and first published in the Journal of the American Chemical Society, volume 60, at page 309 (1938). This method was subsequently published in A Treatise on Physical Chemistry, edited by Hugh S. Taylor and Samuel Glasstone and published in 1951 by D. Van Nostrand Company, New York; see volume II, pages 602 et seq. The pore surface areas given in this application for patent were determined with use of nitrogen gas.

By way of specific data on the unprecedentedly high bore surface area of the bauxite and carbon aggregate prepared in kiln 1 by our process we submit the following scientific determinations:

Bauxite of the analysis given in our first specific example, when calcined at a maximum temperature of 1600° F. had a pore surface area of 121 square meters per gram.

Ordinary petroleum coke, commonly used with bauxite and other ores in the preparation of charge for chlorinating retorts, blast furnace, reducing retorts, etc., has a pore surface area of less than 20 square meters per gram, and often less than 10 square meters per gram.

Aggregate prepared from bauxite and asphalt by the process described herein, and carbonized at 1600° F. had a pore surface area of 206 square meters per gram. This pore surface area is 70% greater than that of bauxite calcined alone.

Some of the aggregate just described above as having a pore surface area of 206 square meters per gram was ignited at 1000° F., and the bauxite residue had a pore surface area of 176 square meters per gram. This pore surface area of 176, compared with a pore surface area of 121 square meters per gram for the same bauxite when calcined alone at 1600° F., illustrates the degree to which our process either opens up and increases the pores of the bauxite during carbonization or inhibits the normal shrinking thereof even at temperatures as moderate as 1600° F.

The bauxite-carbon aggregate mentioned above as having a pore surface area of 206 square meters per gram was prepared with an Eastern Venezuela vis-broken pitch with a softening point (ASTM Method D36) of 350°–360° F., with 3.29% sulfur and 1.25% nitrogen. An analysis showed moisture nil, ash 0.09%, volatile matter 55.0%, and fixed carbon 44.91%.

The description of our process, up to this point, is directed to an operation in which the flow of the material-in-process and of the combustion gases is countercurrent. However, the process can, with equal effectiveness and advantage, be operated with the material-in-process and the combustion gases flowing in the same direction. The necessary apparatus for this type of operation is shown in Figure 5, which has already been described. When, as in Figure 5, the furnace is positioned at the higher end of the kiln and the material-in-process and the combustion gases flow in the same direction, it is possible to get the ore to a substantially elevated temperature in very short travel and to then apply the asphalt to the ore at a temperature conducive to prompt saturation and coking. In this manner of operation there is substantially less chance of forming a sticky mass that will adhere to the wall of the kiln and temporarily fail to move horizontally lengthwise thereof.

In contrast with the high temperatures of 1600° F. to 1800° F. required for chlorination of bauxite and coke mixtures in the past, aggregates made according to the invention herein described will chlorinate about 40% more rapidly at a temperature of 1000° F. than a mechanical mixture of finely divided bauxite and coke will chlorinate at a temperature of 1550° F. Operating at 1000° F. our aggregate was chlorinated with 83% conversion of the bauxite and 99% conversion of the chlorine, with every evidence that 100% of the bauxite would have been converted if chlorination had been continued. In contrast with these results, while conducting the operation in the same manner, we were unable to attain a conversion of more than 56% of the bauxite when operating at a temperature of 1550° F. with a mechanical mixture of finely divided bauxite and coke, and we were unable to attain a conversion of more than 68% of the bauxite in the same mixture when chlorinating at 1800° F. Tests show that our aggregate chlorinates as well at temperatures in the range of 1300° F. to 1400° F. as was possible at 1800° F. when chlorinating by previously known methods.

A full description of the manufacture of anhydrous aluminum chloride with an aggregate of this character, together with additional specific examples thereof, will be found in our application Serial No. 477,248 filed on the same day as this application and entitled Manufacture of Anhydrous Aluminum Chloride.

The relatively low temperatures used in our process are not merely temperatures which can be used but they are temperatures which should be used. By way of illustrating this point separate but identical samples of our bauxite and carbon aggregate were maintained for a period of sixteen hours in an atmosphere of nitrogen at temperatures of 1550° F., 1800° F., 2100° F., and 2400° F. X-ray diffraction patterns of these samples indicated the presence of only alpha $Al_2O_3$ in the samples which had been maintained at 2100° F. and at 2400° F. The sample maintained at 1800° F. comprised alpha $Al_2O_3$ and some transition form of $Al_2O_3$ between the gamma and alpha forms. The sample of $Al_2O_3$ heated at 1550° F. was principally of the gamma and chi forms. The alpha form of alumina is of very low reactivity, and the reactivity increases sharply through the gamma and chi forms.

Another ore-carbon aggregate produced by our process is an aggregate of phosphate rock and carbon for reduction by the blast furnace method. This aggregate makes it possible to reduce the phosphate rock at temperatures in the neighborhood of 2300° F., an operation which has not been accomplished heretofore. This aggregate also makes possible a substantially higher recovery of phosphorus than has been attainable in prior blast furnace operations. The temperature of approximately 2300° F. in the reducing furnace is approximately 500 to 700 Fahrenheit degrees lower than has been known to the prior art. It permits reduction of the phosphate rock at a temperature which does not melt the other constituents of the phosphate rock and which permits the removal of such material as a residue from the blast furnace in dry granular form. We have found that the reduction of the phosphate rock in the form of an aggregate such as herein described and at the temperature herein specified can be accomplished with high grade and medium grade phosphate rock without substantial reduction of the iron oxide content of the rock and without any measurable production of ferrophosphorus. The elimination of ferrophosphorus as a product makes about seven percent more of the phosphorus available for conversion into phosphoric acid, and the granular solid residue from our process carries away about seven percent less of the phosphorus than is common in conventional blast furnace reduction of phosphate rock. These reduced losses result in increasing the yield of phosphoric acid by as much as 15%.

The following is a specific example of our aggregate and the method of producing the same.

A horizontal rotary kiln such as hereinbefore described was charged with 2800 pounds per hour of bauxite containing 32.7% $H_2O$ and, through conduits 33 to 37 inclusive and nozzles 39, with 3400 pounds per hour of West Texas pitch. The bauxite, on a water-free basis, analysed as follows:

| | Percent by weight |
|---|---|
| $Al_2O_3$ | 90.8 |
| $TiO_2$ | 1.7 |
| $SiO_2$ | 4.5 |
| $Fe_2O_3$ | 1.0 |

The West Texas pitch had the following properties:

| | |
|---|---|
| Specific gravity 60 F./60° F | .9965. |
| Softening point (ASTM D36) | 88° F. |
| Sulfur | 2.26 Wt. percent. |
| Fixed carbon | 16.76 Wt. percent. |
| Distillation: | |
| I. B. P | 426° F. |
| 2% Overhead | 619° F. |
| 5% Overhead | 949° F. |
| 10% Overhead | 986° F. |
| 20% Overhead | Above 1000° F. |

The aggregate was prepared in a horizontal rotary kiln having a length of sixty feet and a diameter of six feet. The bauxite was heated therein without asphalt in the first five feet of travel, and at five feet from the entrance it received its first spray of liquid asphalt. Four additional sprays of asphalt were charged to the material-in-process, these sprays being positioned at distances of twenty feet, thirty-three feet, forty-four feet, and fifty-three feet from the point at which bauxite entered, the last of those points being seven feet from the discharge end of the kiln. The asphalt completely penetrated the bauxite and, with a furnace chamber temperature of 1900° F. and with gases leaving the kiln at a temperature of 700° F., each increment of asphalt was well carbonized before the addition of the next increment. Residence time of the material in the kiln was approximately 45 minutes. The fully carbonized aggregate contained sixty pounds of carbon per hundred pounds of oxygen in the ore, and the burn-off in the kiln was approximately seven percent.

The aggregate prepared as described, left the kiln at a temperature of 1635° F. and was then introduced at a temperature of 1390° F. into a chlorinating retort. Dry chlorine gas at atmospheric temperature was charged to the retort and the chlorination proceeded smoothly and at a very satisfactory rate. Anhydrous aluminum chloride generated in the chlorinating retort was condensed and separately recovered. The bauxite-coke aggregate prepared according to this invention chlorinated smoothly at a temperature of approximately 1400° F. despite the fact that chlorination of mechanical mixtures of bauxite and carbon has always required minimum temperatures of 1600° to 1800° F. The same high temperatures of 1600° F. to 1800° F. have always been required to chlorinate briquettes of finely ground bauxite and carbon. Other specific examples of the manufacture of an aggregate of bauxite and carbon are set forth in full in our aforesaid application Serial No. 477,248.

A second specific example of our aggregate and method of producing the same is as follows:

The raw material was phosphate rock of the following analysis:

| | Percent |
|---|---|
| $Al_2O_3$ | 2.28 |
| $P_2O_5$ | 31.06 |
| $Fe_2O_3$ | 1.62 |
| F | 1.92 |
| $TiO_2$ | .56 |
| $SiO_2$ | 6.67 |
| $ZrO_2$ | 6.82 |
| CaO | 49.00 |

A horizontal rotary kiln such as hereinbefore described was charged with 3000 pounds per hour of the above described phosphate rock, and through conduits 33 to 37 inclusive and nozzles 39 with 1150 pounds per hour of a 17% residue of Baxterville (Mississippi) crude oil the 17% residue having the following tests:

| | |
|---|---|
| Solid gravity 77° F./77° F. | 1.153 |
| Softening point (ASTM D36) °F. | 441 |
| Sulfur, wt. percent | 5.53 |
| Carbon residue | 55.2 |
| Proximate analysis: | |
|    Volatile matter percent | 50.9 |
|    Fixed carbon do | 49 |
|    Ash do | 0.11 |
|    V p. p. m | 186 |
|    Ni p. p. m | 84 |
|    Cu p. p. m | 2 |
|    Fe p. p. m | 375 |

The carbon content of the 1150 pounds of asphalt was 563 pounds. The burn-off in the kiln was about 7% and there were 521 pounds of carbon in the aggregate fed to the blast furnace each hour. This amount was provided on the basis of 0.55 pound of carbon for each of 675 pounds of oxygen in the portions of the ore reduced, plus an additional 150 pounds of carbon per hour for burn-off in the blast furnace.

The aggregate was prepared in a horizontal rotary kiln having a length of sixty feet and a diameter of six feet. The phosphate rock was heated therein without asphalt in the first five feet of travel, and at five feet from the entrance it received its first spray of liquid asphalt. Four additional sprays of asphalt were charged to the material-in-process, these sprays being positioned at distances of twenty feet, thirty-three feet, forty-four feet, and fifty-three feet from the charging end of the kiln, the last of those points being seven feet from the discharge end of the kiln. The asphalt coated and penetrated and was tightly bound to the phosphate rock and, with a furnace temperature of 2100° F. and with gases leaving the kiln at a temperature of approximately 700° F., each increment of asphalt was well carbonized before the addition of the next increment. Residence time of the material in the kiln was approximately 45 minutes.

The aggregate left the kiln at a temperature of 1830° F. and, at a temperature approximately 100° lower, was charged into a blast furnace. No silica or other slagging material was added. With the aid of a hot blast the temperature in the blast furnace was maintained as close as possible to 2300° F. and no readings were more than 30° above or below that temperature. Despite the fact that blast furnace reduction of phosphate rock has ordinarily required temperatures of 2800° to 3000° F., it was possible to maintain even and satisfactory operation of the blast furnace at these low temperatures. The phosphorus content of the phosphate rock was substantially completely reduced. The phosphorus content of the blast furnace effluent was then oxidized, hydrated to $H_3PO_4$, condensed, and separately obtained.

A full description of the manufacture of phosphoric acid with an aggregate of this character, together with an additional specific example thereof, will be found in our aforesaid application Serial No. 477,304.

In this specification and the appended claims the term "horizontal rotary kiln" is used to designate the type of kiln commonly known by that designation, notwithstanding that such kilns are in fact inclined kilns having the charging end elevated somewhat above the discharge end.

We claim:

1. The process of manufacturing a highly reactive aggregate of an oxide ore and carbon which comprises: charging an oxide ore to a heated horizontal rotary kiln; rotating the kiln and thereby tumbling the oxide ore and causing it to travel longitudinally through the said kiln; applying a small percentage of liquefied petroleum asphalt to the oxide ore at a point near the charging end of the said kiln; maintaining the temperature in the said kiln within a range that will carbonize the applied asphalt; carbonizing the applied small percentage of asphalt; successively applying and carbonizing additional small percentages of asphalt with the said oxide ore during its longitudinal passage through the said kiln; and discharging from the kiln an aggregate of fully carbonized asphalt and oxide ore.

2. The process of manufacturing a highly reactive aggregate of an oxide ore and and carbon which comprises: charging an oxide ore to a heated horizontal rotary kiln; rotating the kiln and thereby tumbling the oxide ore and causing it to travel longitudinally through the said kiln; applying a small percentage of liquefied petroleum asphalt to the oxide ore at a point near the charging end of the said kiln; maintaining the temperature in the said kiln within a range that will carbonize the applied asphalt; carbonizing the applied small percentage of asphalt; successively applying and carbonizing additional small percentages of asphalt with the said oxide ore during its longitudinal passage through the said kiln until the weight of the carbonized asphalt is at least 45 perecent as great as the weight of the oxygen in the oxide ore; and discharging from the kiln an aggregate of fully carbonized asphalt and oxide ore.

3. The process of manufacturing a highly reactive aggregate of an oxide ore and carbon which comprises: charging an oxide ore to a heated horizontal rotary kiln; rotating the kiln and thereby tumbling the oxide ore and causing it to travel longitudinally through the said kiln; applying to the oxide ore at a point near the charging end of the said kiln a small percentage of liquefied petroleum asphalt sufficient to saturate the oxide ore therewith; maintaining the temperature in the said kiln within a range that will carbonize the applied asphalt; carbonizing the applied small percentage of asphalt; successively applying and carbonizing additional small percentages of asphalt with the said oxide ore during its longitudinal passage through the said kiln until the weight of the carbonized asphalt is at least 45 percent as great as the weight of the oxygen in the oxide ore.

4. The process of manufacturing a highly reactive aggregate of an oxide ore and carbon which comprises: charging an oxide ore to a heated horizontal rotary kiln; rotating the kiln and thereby tumbling the oxide ore and causing it to travel longitudinally through the said kiln; applying a small percentage of liquefied petroleum asphalt to the oxide ore at a point near the charging end of the said kiln; maintaining the temperature in the said kiln within a range that will carbonize the applied asphalt; carbonizing the appled small percentage of asphalt; successively applying and carbonizing additional small percentages of asphalt with the said oxide ore during its longitudinal passage through the said kiln until the weight of the carbonized asphalt is at least 45 percent as great as the weight of the oxygen in the oxide ore; and limiting the said small percentages of asphalt to such quantity as can be carbonized with the oxide ore without forming an adhesive mass that adheres to the kiln wall.

5. The process of manufacturing a highly reactive aggregate of bauxite and carbon which comprises: charging bauxite to a heated horizontal rotary kiln; rotating the kiln and thereby tumbling the oxide ore and causing it to travel longitudinally through the said kiln; applying a small percentage of liquefied petroleum asphalt to the oxide ore at a point near the charging end of the said kiln; maintaining the temperature in the said kiln within a range that will carbonize the applied asphalt, while not heating the material-in-process above 1600° F.; carbonizing the applied small percentage of asphalt; successively applying and carbonizing additional small percentages of asphalt with the said oxide ore during its longitudinal passage through the said kiln until the total of such carbonized asphalt is sufficient to fully reduce the said bauxite; and discharging from the kiln a fully carbonized aggregate of oxide ore and asphalt.

6. The process of manufacturing a highly reactive aggregate of bauxite and carbon which comprises: charging bauxite ore to a heated horizontal rotary kiln; rotating the kiln and thereby tumbling the bauxite and causing it to travel longitudinally through the said kiln; applying a small percentage of liquefied petroleum asphalt to the bauxite at a point near the charging end of the said kiln; maintaining the temperature in the said kiln within a range that will carbonize the applied asphalt, while not heating the material-in-process above 1600° F.; carbonizing the applied small percentage of asphalt; successively applying and carbonizing additional small percentages of asphalt with the said bauxite during its longitudinal passage through the said kiln until the weight of the carbonized asphalt is at least 45 percent as great as the weight of the oxygen in the bauxite; and discharging from the kiln an aggregate of fully carbonized asphalt and bauxite.

7. The process of manufacturing a highly reactive aggregate of an oxide ore and carbon which comprises: charging to a heated horizontal rotary kiln a major portion of an oxide ore and a minor portion of coke; rotating the kiln and thereby tumbling the oxide ore and coke and so causing them to travel longitudinally through the said kiln; applying a small percentage of liquefied petroleum asphalt to the said major portion of an oxide ore and said minor portion of coke at a point near the charging end of the said kiln; maintaining the temperature in the said kiln within a range that will carbonize the applied asphalt; carbonizing the applied small percentage of asphalt; successively applying and carbonizing additional small percentages of asphalt with the said major portion of an oxide ore and said minor portion of coke during the longitudinal passage of the material-in-process through the said kiln until the total weight of the carbon in the aggregate is at least 45 percent as great as the weight of the oxygen in the oxide ore and until the carbonized asphalt at least equals in weight the said minor portion of coke initially charged to the kiln with the oxide ore; and discharging from the kiln an aggregate of fully carbonized asphalt, coke, and oxide ore.

8. The process of manufacturing a highly reactive aggregate of bauxite and carbon which comprises: charging bauxite to a heated horizontal rotary kiln; rotating the kiln and thereby tumbling the bauxite and causing it to travel longitudinally through the said kiln; applying a small percentage of liquefied petroleum asphalt to the bauxite at a point near the charging end of the said kiln; maintaining the temperature in the said kiln within a range that will carbonize the applied asphalt; carbonizing the applied small percentage of asphalt; successively applying and carbonizing additional small percentages of asphalt with the said bauxite during its longitudinal passage through the said kiln; and discharging from the kiln an aggregate of fully carbonized asphalt and bauxite in which the proportion of carbonized asphalt to bauxite is not less than that required for reduction of the bauxite.

9. A highly reactive aggregate of dehydrated bauxite and carbonized asphalt in which the aluminum oxide of the contained bauxite is predominantly in the gamma and chi forms.

References Cited in the file of this patent

UNITED STATES PATENTS

| | | |
|---|---|---|
| 2,158,513 | Lloyd | May 16, 1939 |
| 2,399,096 | Byrns | Apr. 23, 1946 |
| 2,477,412 | Lohse | July 26, 1949 |

FOREIGN PATENTS

| | | |
|---|---|---|
| 749,344 | Germany | May 12, 1943 |